United States Patent [19]
Dietrich

[11] Patent Number: 5,820,774
[45] Date of Patent: Oct. 13, 1998

[54] CERAMIC CORE FOR CASTING A TURBINE BLADE

[75] Inventor: Douglas James Dietrich, West Palm Beach, Fla.

[73] Assignee: United Technologies Corporation, Hartford, Conn.

[21] Appl. No.: 689,983

[22] Filed: Oct. 28, 1996

[51] Int. Cl.⁶ .................................................. B29C 33/76
[52] U.S. Cl. ...................... 249/61; 29/889.721; 164/369; 249/184
[58] Field of Search ................................. 249/61, 62, 175, 249/184; 29/889.721; 164/122.1, 369

[56] References Cited

U.S. PATENT DOCUMENTS

| | | | |
|---|---|---|---|
| 2,972,805 | 2/1961 | Hignett et al. | 29/889.721 |
| 4,010,531 | 3/1977 | Andersen et al. | 29/889.721 |
| 4,627,480 | 12/1986 | Lee | 164/349 |
| 4,820,123 | 4/1989 | Hall | 416/97 R |
| 5,243,759 | 9/1993 | Brown et al. | 29/889.721 |
| 5,337,805 | 8/1994 | Green et al. | 164/349 |
| 5,599,166 | 2/1997 | Deptowicz et al. | 164/349 |

*Primary Examiner*—Robert Davis
*Attorney, Agent, or Firm*—Norman Friedland

[57] ABSTRACT

The internally air cooled turbine cast blade is molded with a ceramic core for defining the interior cavity with coolant passages where the ceramic core is configured to fair radially inwardly at the attachment portion of the blade until they form a single wall, parallel to and centered in the blade attachment. The blade is cast in the mold by pouring molten metal into the mold, curing and the core is leached once the metal is cured and the mold removed. Another embodiment includes a metering plate attached to the root of the blade for metering coolant to provide a coolant to gas flow ratio at the film cooling holes.

5 Claims, 6 Drawing Sheets

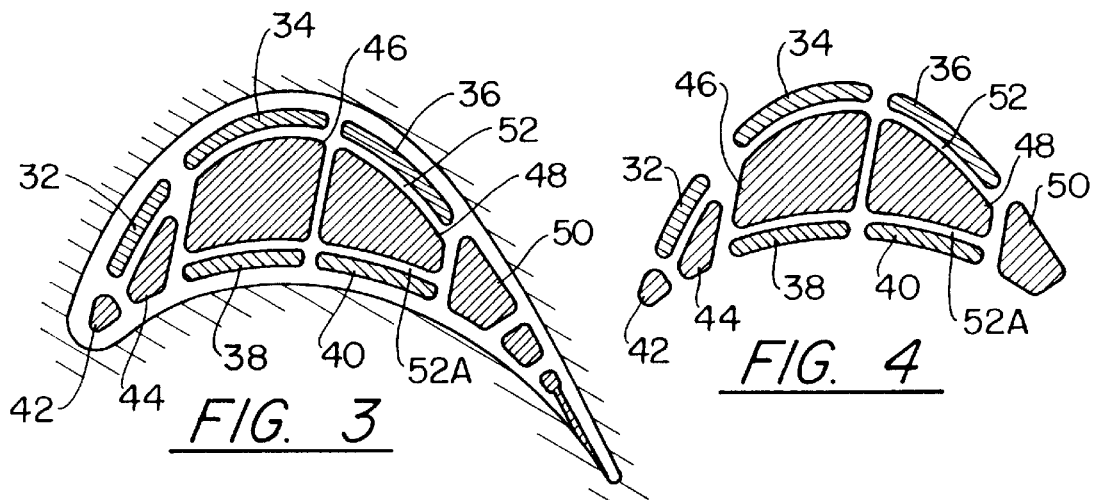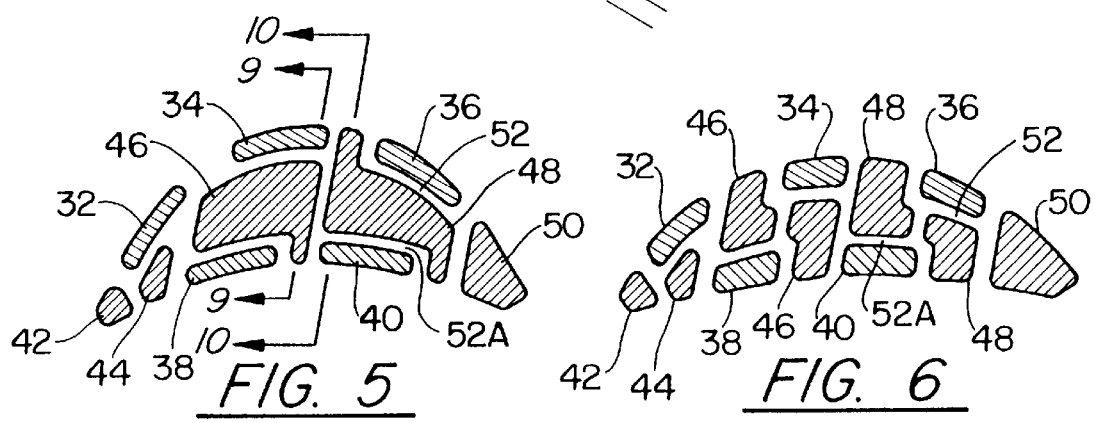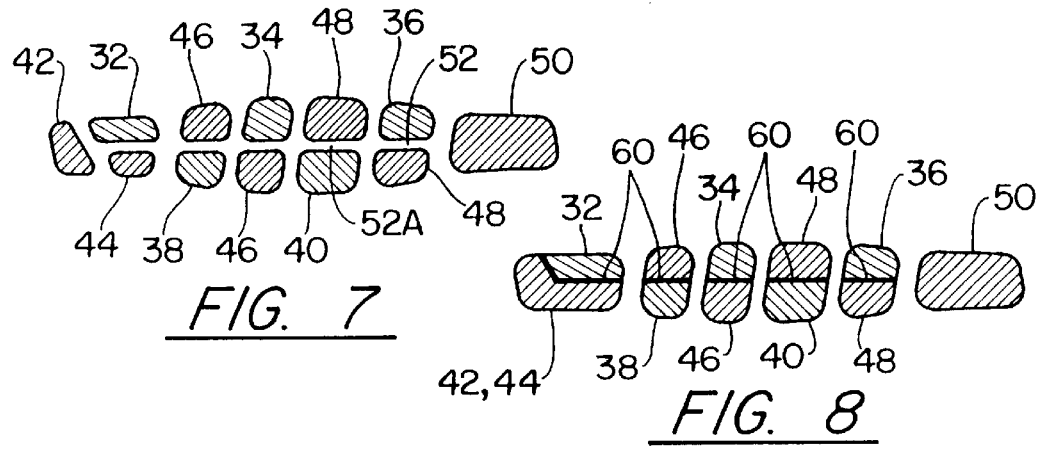

CERAMIC CORE FOR CASTING A TURBINE BLADE

This invention was made under a Government contract and the United States Government has an interest herein.

TECHNICAL FIELD

This invention relates to air cooled turbine blades for gas turbine engines and particularly to the casting configuration for molding the turbine blade and the method thereof.

BACKGROUND ART

As one skilled in the gas turbine engine's turbine blade technology appreciates, the formation of the internal cooling passages in a turbine blade present formidable problems. Typically, these passages are formed in the molding process for casting the blade utilizing ceramic cores. These ceramic cores are extremely brittle and the thickness is finite and obviously, have the propensity of breaking. Because of the material and the finite sizes of these passages the producibility of the blades are adversely impacted. Not only is the blade designer confronted with these molding problems, he must also take into consideration the effectiveness of cooling of the blades by virtue of these cooling passages. This coupled with the fact that the sizes and locations of the passages internally of the blade are critical, the cooling requirements of the blades in order to maintain its structural integrity in the engine's hostile environment are severe compounds the complexity of the designer's task. In addition the designer must be cognizant of the fact that the air utilized for cooling is taken from the engine after a certain amount of processing of this air has occurred which obviously impacts the performance of the engine. Not only is the amount of work that has been done on that cooling air represents a penalty to the engine's performance, it is obviously necessary to utilize only that much air that will handle the cooling load. Any extra air used for this purpose accounts for an additional deficit in the performance of the engine. Hence, it is abundantly important that the blade designer designs the cooling aspects of the blade so that only the exact amount of cooling air is utilized over the operating envelope of the engine. Also, the designer must assure that the integrity of the blades is not compromised while at the same time the efficiency of the engine is not jeopardized.

This invention solves the problem of effective blade cooling while at the same time designing the core used in molding the blade such that the blade structure is enhanced while the breakage of the core used in forming the cooling passages is eliminated or minimized. As is well known in this industry, core breakage has been a problem confronting the blade designer for some time. As will be described in more detail hereinbelow, by virtue of this invention both breakage and distortions of the end part and the ceramic core assembly are eliminated or minimized. The core of the turbine blade is formed from a unique configuration which significantly enhances the producibility of both the end part and ceramic core that is utilized to make the end part. The turbine blade fabricated from this invention involves a 4-walled, cooled, single-piece configuration and utilize a three piece assembled core in which each piece is made using production-oriented methods and materials. The blade to which is being referred herein is not to be mistaken with the heretofore known multi-piece cores and 4-walled castings.

In accordance with this invention, the turbine blade is formed from a unique configuration in which individual segments which make up the inner walls of the 4-walled casting taper and merge, alternating from either side of the airfoil while fairing radially inward, until they line up to form a single wall, parallel to and centered in the blade attachment portion. Essentially, this configuration effectively results in a 4-walled airfoil blending into a 3-walled attachment region with each cavity element maintaining direct radial flow coolant feed.

This configuration for producing the ceramic cores necessary in making the hollow castings affords several advantages. For example, in a 3-piece type core, where the ceramic core elements which produce the hybrid cavities are made separately from the main body ceramic core element, the present invention allows the hybrid cores on both sides of the main body core to be substantially thickened in the blade attachment area without excessively displacing the main body core. This is a benefit because the ceramic cores which produce the hybrid cavities are cantilevered, from the attachment area, for the entire length of the airfoil and would be too susceptible to breakage or deflection without thickening. Another benefit from thickening the hybrid cores in the attachment area is that coolant flow entry losses are minimized by having a larger feed area directly in line with the coolant flow.

The problem associated with the molding process is perhaps best understood by referring to FIG. 1 which is a prior art illustration of the formation of the passageways in the turbine blade. As noted in FIG. 1, the attachment portion of the blade depicted schematically is indicated by reference numeral 110. The inner passages formed by the multi-piece core is depicted by reference numeral 112 and location of the core joints are depicted by the dash lines 114. The disadvantage of this prior art configuration are numerous and include, without limitation, the following:

a) these hybrid cores can not be thickened on both sides without displacing the main body;

b) On a 3-piece assembled core configuration, the core joints would require a matched plug and socket type of contour, increasing the potential for mismatched surfaces;

4) Flash at the core joints would occur perpendicular to the coolant flow causing blockage of the cooling air;

5) Direct access for flash removal is difficult, if not impossible; Complete flash removal causes risk of damaging the surfaces of the blade neck; and 6) There are no provisions for selectively metering coolant flow into a particular hybrid cavity.

Not only does this invention afford advantages in producing the ceramic cores necessary in making the hollow casting, it affords advantages to the cast part. As one skilled in this art appreciates, when a multi-piece ceramic core is used to produce a hollow casting, metal finning or flash can occur at the joint lines of adjacent core elements when the gaps between the core element mating surfaces are not completely filled by the bonding material. This invention obviates or minimizes this problem because the core element joints are positioned in a location that is parallel to and centered in the blade attachment portion therefore providing direct access for flash removal through the attachment coolant feed passages. Since any remaining flash or partially removed flash will be parallel to the coolant flow stream, this remaining flash will not interfere with the coolant flow stream and hence, flow blockage will not occur.

This invention also lends itself to attaching a metering plate at the foot of the blade so that the cooling air can be selectively metered into a hybrid cavity. This is particularly important where it is desired to improve the film cooling effectiveness across the outside wall of the blade. The metering plate allows the designer to size the inlet to the internal cavities so that the pressure supplied therein is controlled so as to provide a desired pressure ratio between the coolant and the engine's working medium or gas path.

SUMMARY OF THE INVENTION

An object of this invention is to provide an improved internally cooled turbine blade.

An additional object is to provide for an internally cooled turbine blade means for metering the flow admitted internally of the blade.

A feature of this invention is the configuration of the core for forming the cooling passages in the blade.

A further feature of this invention is the method of forming the cooling passages of the blade with a ceramic core.

The foregoing and other features of the present invention will become more apparent from the following description and accompanying drawings.

BRIEF DESCRIPTION OF DRAWINGS

FIG. 3 is a sectional view taken through line 3—3 of FIG. 2;

FIG. 4 is a sectional view taken through line 4—4 of FIG. 2;

FIG. 5 is a sectional view taken through line 5—5 of FIG. 2;

FIG. 6 is a sectional view taken through line 6—6 of FIG. 2;

FIG. 7 is a sectional view taken through line 7—7 of FIG. 2;

FIG. 8 is a sectional view taken through line 8—8 of FIG. 2;

DETAILED DESCRIPTION OF THE PREFERRED EMBODIMENT

Reference is now made to FIGS. 2–10 illustrating the details of this invention. As mentioned earlier the invention is concerned with a 4-walled, cooled, single-piece cast turbine blade and teaches the unique configuration of the core which significantly enhances the producibility of both the end part and the ceramic core assembly required to make it. The configuration utilizes either a three or four piece assembled core made from a suitable ceramic material in which each piece is made using production-oriented methods and materials.

Essentially, the pieces or individual segments of the core are uniquely configured to make up the inner walls of the 4-walled casting. The segments taper and merge, alternating from either side of the airfoil while fairing radially inward, until they line up to form a single wall, parallel to and centered in the blade attachment. As will be appreciated by those skilled in this art, this configuration effectively results in a 4-walled airfoil blending into a 3-wall attachment region with each cavity element maintaining direct radial flow coolant feed.

Figure 2:
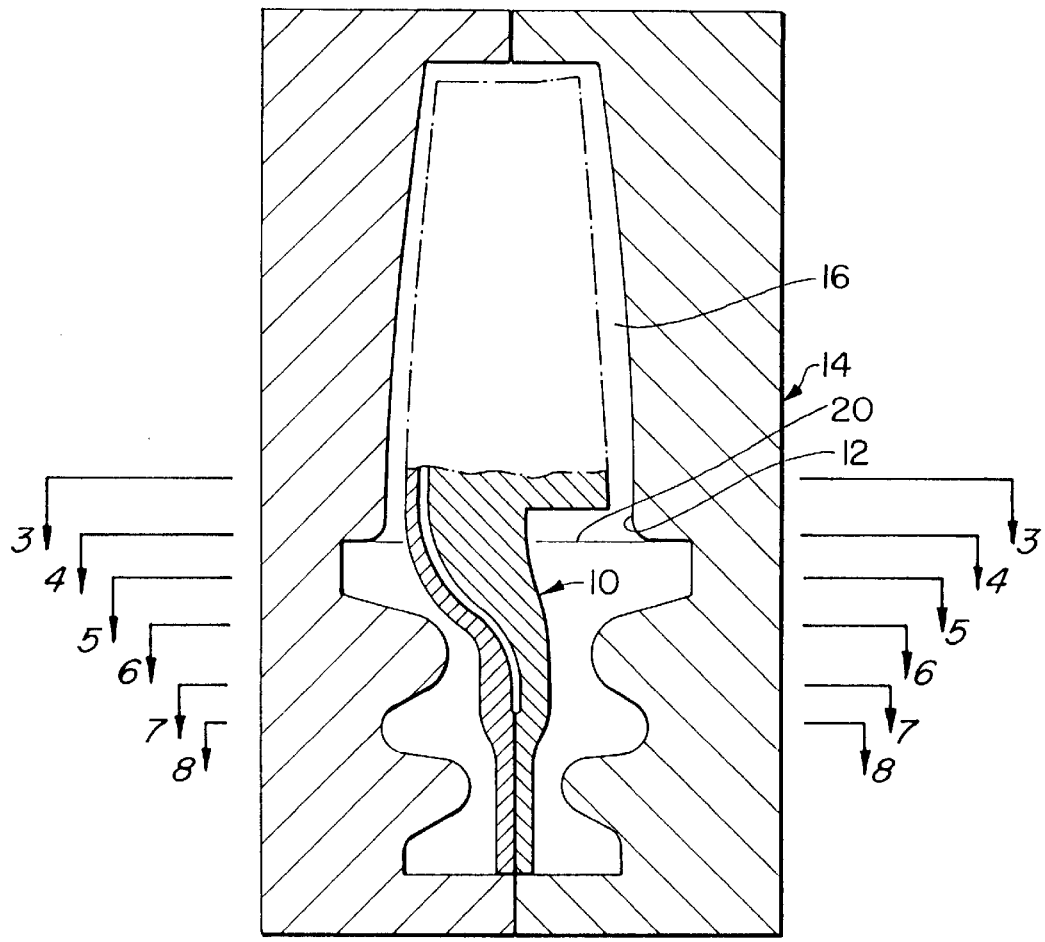
FIG. 2 is a partial view through the same plane as the plane taken in FIG. 1 illustrating the present invention.
Figure 1:
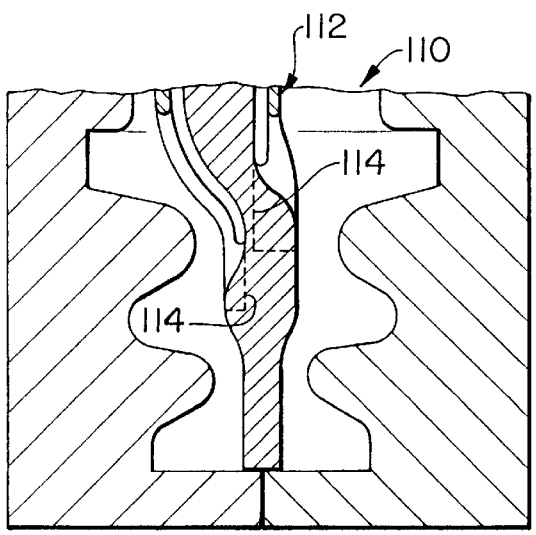
FIG. 1 is a view down the blade attachment center line partially in section illustrating a prior art ceramic core.

As can be seen in FIG. 2 the core segments 10 are disposed in the cavity 12 of the mold 14 as seen before being filled with molten metal and subsequently leached. The dash lines 16 defines the dimension and shape of the internal cavity of the blade adjacent the airfoil section 18 (FIG. 13) and the portion below line 20 is the form of the fir tree attachment of the blade. The core segments as is typical in this type of construction consists of the main body core elements, the pressure side core elements, and the suction side of core elements. The number of each of these elements are dependent on the particular configuration of the internal structure of the blade and is consistent with current casting techniques. This invention is primarily directed to the method of providing coolant, through a blade attachment, to the walls of a 4-walled airfoil.

Figure 13:
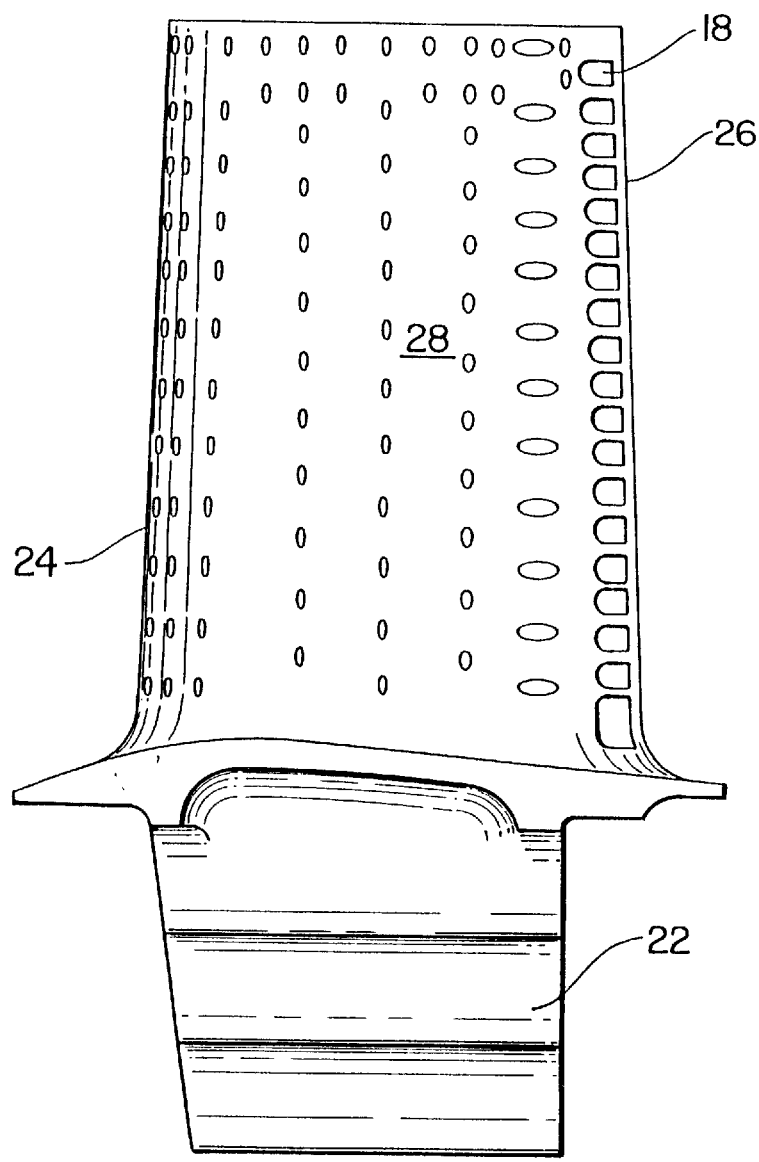
FIG. 13 is an elevated view of a typical cast prior art turbine blade.

FIG. 13 typifies of the cast turbine blade showing the airfoil section 18 and the attachment section 22, the leading edge 24, the trailing edge 26 and the pressure side 28. The suction side (shown in FIG. 3) is on the back side of the pressure side and coextensive therewith. This invention is concerned with the cavities and passages formed in the root of the blade or the attachment portion 22.

FIGS. 3–10 are sections taken through the attachment portion 22 and demonstrate the transition extending from the base of the airfoil to the bottom of the attachment 22. As will be appreciated in this embodiment, the core segments 10 include three core sections 32, 34 and 36 of the suction side hybrid core; two core sections 38 and 40 of the pressure side hybrid core and five core segments of the main body core 42, 44, 46, 48 and 50. The inner wall segments as noted by the points 52 and 52A as they progress toward the root, taper and merge to form a single wall centered in the blade attachment as can be seen by the planar core joint 60 of FIG. 8.

Figure 9:
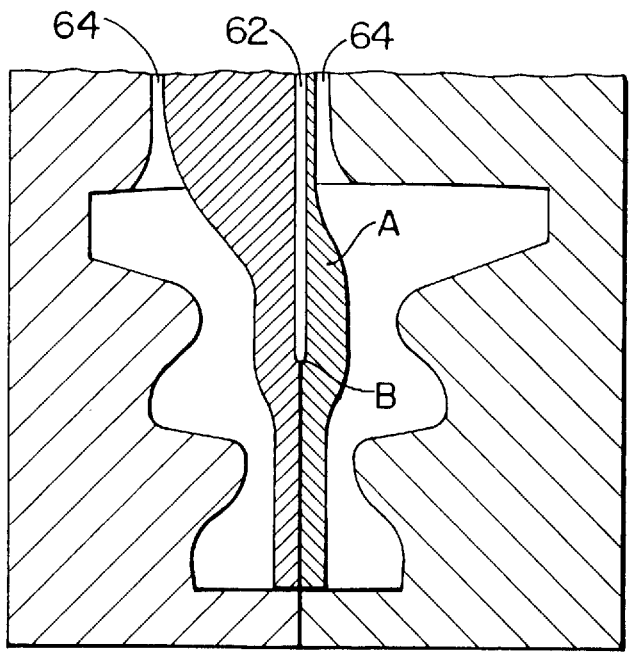
FIG. 9 is a sectional view taken through line 9—9 of FIG. 5.
Figure 10:
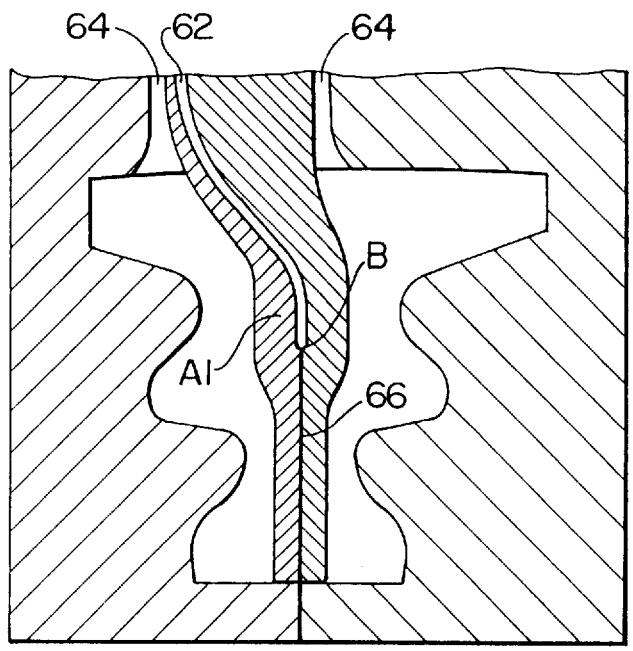
FIG. 10 is a sectional view taken through line 10—10 of FIG. 5.

As best seen in FIGS. 9 and 10 which are sections taken along lines 9—9 and 10—10 of FIG. 5, the main body core and mold define the inner walls 62 and outer walls 64. The configuration of the core segments provide a thickened pressure side hybrid core as noted in the area designated by A and a thickened suction side hybrid core as noted in the area designated A1. The inner walls 62 line up to form a single wall 66 at location B and form a planar core joint surface extending down to the bottom of the attachment section. As noted, the hybrid ceramic cores are cantilevered outboard from location B. It will be appreciated that the flash occurring at core joint at location B is parallel to coolant flow and accessible for removal.

Figure 11:
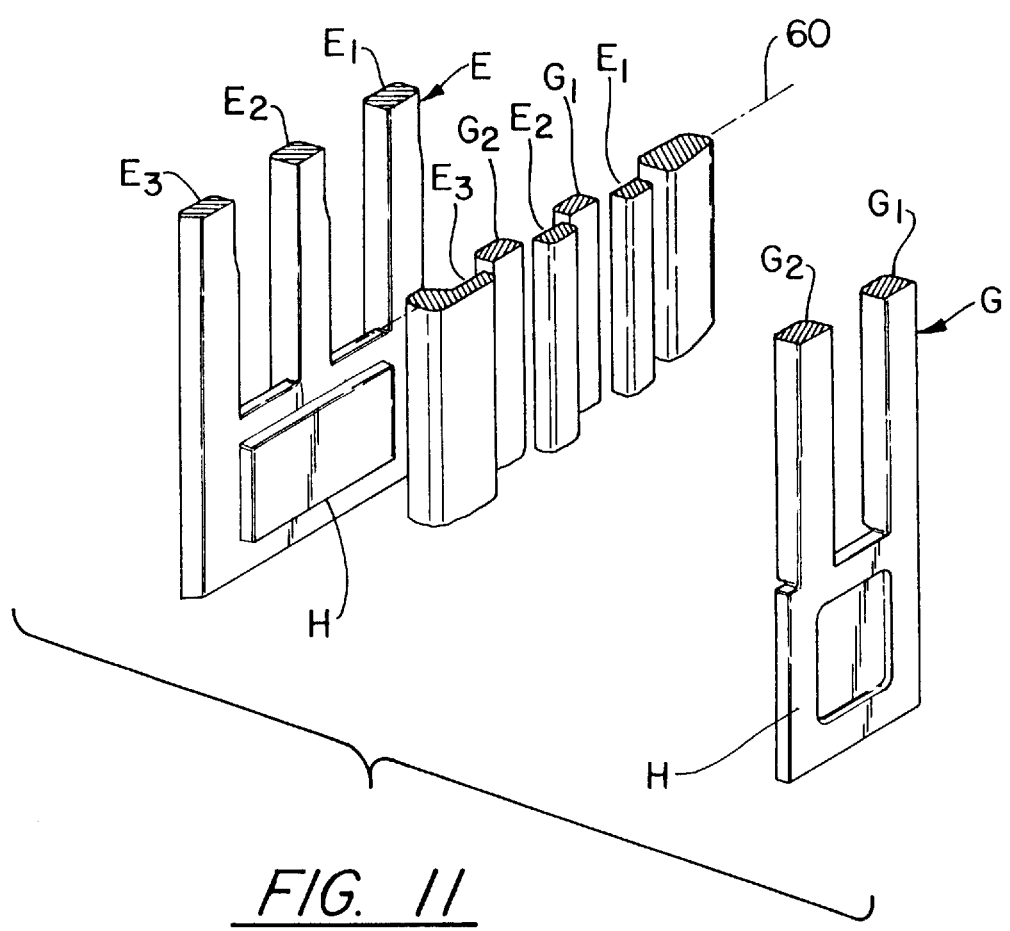
FIG. 11 is an enlarged, exploded and schematic view in perspective illustrating the core sections used in a typical casting made in accordance with this invention.

As mentioned earlier, it is important that the mating surfaces of the segments of the ceramic core that are bonded together before being assembled in the mold accurately fit. The fit, in fact, must almost have a zero tolerance. By virtue of this invention as best seen in FIG. 11, which is an enlarged perspective view, the core segments E, F and G are configured so that all of the adjacent surfaces of the base portion H are flat and planar. As noted from this FIG., in the segment F the fingers extending axially from the base portion H of segments E and G merge as shown by $G_1$, $G_2$ and $G_3$, and $E_1$ and $E_2$ respectively, and align with the plane 60. This assures that the tolerances can be held to a minimum. Obviously, this eliminates the need to match contours or have close tolerance plug and socket type inserts thereby, eliminating or minimizing the potential mismatching of surfaces.

This core configuration lends itself to being utilized in the conventional lost wax investment casting process for hollow turbine blades.

Figure 12:
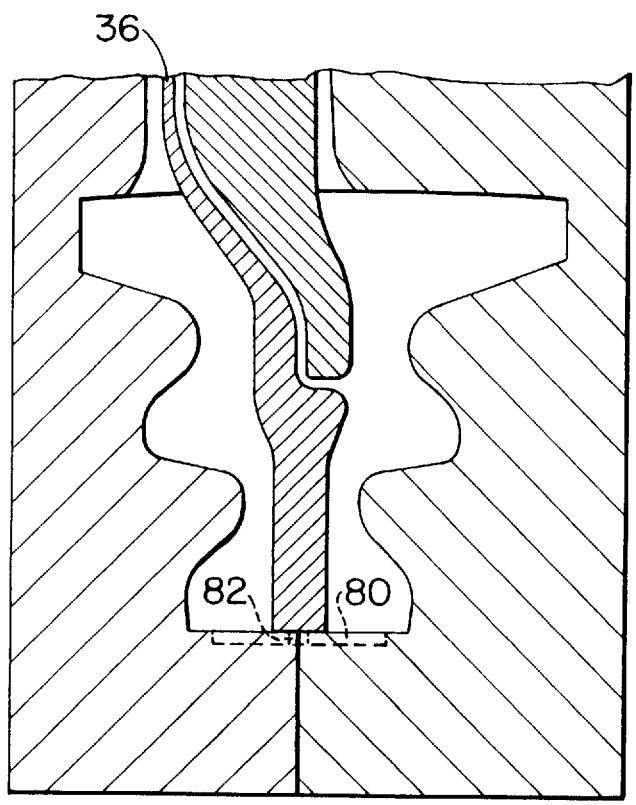
FIG. 12 is a partial view of the mold for casting the blade including a metering plate attached to the root of the blade for metering coolant into the internal passages of the blade.

FIG. 12 exemplifies another embodiment of this invention whereby a metering plate 80 having the metering orifice 82 is attached to the foot of the blade. Orifice 82 is sized to selectively meter the flow into the internal cavities in the blade in order to control the pressure ratio across the film cooling holes of the blade between the engine's gas path and the coolant. This assures that a more favorable film cooling effectiveness is obtained adjacent the exterior surface of the blade. The film cooling holes are best seen in FIG. 13. For additional information about the finished turbine blade reference should be made to the blades disclosed in the following patents:

U.S. Pat. Nos. 5,243,759 granted to Brown et al on Sep. 14, 1993 entitled "Method of Casting to Control Air Flow Rate of the Airfoil Trailing Edge" and 4,820,123 granted to Hall on Apr. 11, 1989 entitled "Dirt Removal means for Air Cooled Blades" both of which are commonly assigned to the assignee of this patent application and 4,010,531 granted to Andersen et al on Mar. 8, 1977 entitled "Tip Cap Apparatus and Method of Installation". These patents are incorporated herein by reference.

Although this invention has been shown and described with respect to detailed embodiments thereof, it will be appreciated and understood by those skilled in the art that various changes in form and detail thereof may be made without departing from the spirit and scope of the claimed invention.

I claim:

1. A ceramic core for use in casting a turbine blade and defining the internal cooling passages therein, said blade having a tip, root, pressure side, suction side, leading edge and trailing edge, said core being configured to extend from said root toward said tip between said pressure side, said suction side, said leading edge and said trailing edge, said ceramic core comprising at least three separate complimentary segments, each of said segments including a base portion and a plurality of fingers extending axially from said base portion, said fingers taper and merge relative to each other to form a single wall in said root portion.

2. The ceramic core as claimed in claim 1 wherein the sections of the ceramic core immediately adjacent upstream of the juncture point where said single wall is formed is thicker relative to the portion of the ceramic core downstream of said juncture.

3. The ceramic core as claimed in claim 2 wherein said thicker portion is adjacent to the suction side.

4. The ceramic core as claimed in claim 2 wherein said thicker portion is adjacent to the pressure side.

5. The ceramic core as claimed in claim 1 wherein said ceramic core includes three core sections on said suction side, two core sections on the pressure side and five core segments disposed therebetween.

\* \* \* \* \*